United States Patent [19]
Atkinson et al.

[11] 3,876,521
[45] Apr. 8, 1975

[54] DEUTERATED LUBRICATING OILS
[75] Inventors: Joseph G. Atkinson, Montreal, Quebec; Michael O. Luke, Pinawa, Manitoba, both of Canada
[73] Assignee: Charles E. Frosst & Co., Kirkland, Quebec, Canada
[22] Filed: Feb. 28, 1973
[21] Appl. No.: 336,576

Related U.S. Application Data
[63] Continuation-in-part of Ser. No. 66,657, Aug. 24, 1970, Pat. No. 3,746,634, which is a continuation-in-part of Ser. No. 724,429, April 26, 1968, abandoned.

[52] U.S. Cl. .................... 208/18; 208/143; 252/41; 252/59
[51] Int. Cl. ............................................. C10g 41/00
[58] Field of Search ........................ 208/18, 19, 143

[56]  References Cited
UNITED STATES PATENTS
3,459,656  8/1972  Rausch ................................ 208/18

OTHER PUBLICATIONS
Huebner et al., "Chemical Abstracts," Vol. 68, 70902 Y, 1968.

*Primary Examiner*—Herbert Levine
*Attorney, Agent, or Firm*—Thomas E. Arther; Harry E. Westlake, Jr.; Rudolph J. Anderson, Jr.

[57]  ABSTRACT

Deuterated petroleum fraction lubricating oils having at least 10 carbon atoms, a melting point no greater than 300° C. and an isotopic purity of at least 95 atom % D are described. Deuteration of the substrate in its liquid state is effected with deuterium gas in the presence of a Group VII or VIII metal catalyst at a temperature between about 100°–300° C.

1 Claim, No Drawings

DEUTERATED LUBRICATING OILS

This invention is concerned with deuterated petroleum fraction lubricating oils as well as with the process for preparing these deuterated lubricants which comprises bringing together the lubricating oil substrate (having at least 10 carbon atoms and a melting point no greater than 300° C.) in its liquid state and deuterium gas in the presence of a catalyst from Group VII or Group VIII metals until such time as at least 95 percent of the hydrogen atoms have been replaced by deuterium atoms.

There is no evidence in the literature of exchange work with high boiling hydrocarbons, although attempts were reported in J. Am. Chem. Soc. 84:925 (1962) to deuterate hexene, $\Delta^{1,9}$-octalin and $\Delta^{9,10}$-octalin in liquid phase by bubbling deuterium gas through a mixture of the hydrocarbon and a suspended Pd or Pt catalyst at 24.5° C. This resulted in some of the saturated compounds having more than the number of D atoms necessary for reduction of the unsaturated compound but there was no evidence that high yields of perdeuterated species could be obtained under the conditions used or that exchange of saturated materials occurred. Furthermore, attempts to deuterate decalin in such a system by treatment with deuterium gas over a platinum catalyst at 25° C. failed to cause an exchange. Similarly, British Patent 798,030 (1958) to N. V. DeBataafsche Petroleum Maatschappy, describes deuteration of anthracene in the presence of commercial alumina whereupon only 78 percent of the hydrogens originally present in the anthracene had been replaced by deuterium. Similar results were reported by Hubner et al, C.A. 68:70902[Y] for their attempts to deuterate white oil.

Attempts also have been made to use synthetic routes to deuterate solid paraffins and gasoline range hydrocarbons using metal catalyzed reactions of carbon monoxide and deuterium with the result that such processes give a mixture of products which must be isolated and purified if pure compounds are desired.

As can be seen from a study of the prior art referred to above as well as the prior work discussed in Serial No. 66,657, no procedure has yet been devised which is capable of deuterating petroleum fraction lubricating oils to provide an isotopic purity of at least 95 atom percent deuterium.

It is accordingly an object of the present invention to provide these novel deuterated lubricating oils with an isotopic purity of 95 atom percent D or greater.

It is also a further object of the present invention to provide a process for preparing such deuterated lubricating oils.

In accordance with the present invention there is now provided novel deuterated lubricating oils from said light substrate, said deuterated lubricating oils being characterized by having at least 95 percent of the hydrogen atoms replaced by deuterium atoms. Any hydrocarbon of this type whether straight or branched chain acyclic or cyclic and either saturated or unsaturated can be deuterated to this isotopic purity by the process of this invention. Should the selected substrate be unsaturated it will be deuterogenated under the reaction conditions of this invention to form the novel saturated deuterated lubricating oils of this invention. Among the significantly important products of this invention are the at least 95 percent deuterated hydrocarbon type lubricating oils, whether synthetic or natural, light, medium or heavy grades. Other deuterated lubricating oils having an isotopic content of at least 95 atom % D are provided in the examples to illustrate the process and products of this invention.

It will be appreciated by those knowledgeable in this discipline that material of less than 100 percent isotopic purity contains a mixture of isotopic species. Any highly deuterated compound contains, by definition, little hydrogen, and therefore consists of a large proportion of the specie containing no hydrogen and quite small amounts of less well deuterated species. In contrast, a compound of low isotopic purity contains a relatively large proportion of material containing only hydrogen and varying amounts of species containing one, two, three etc. deuterium atoms per molecule.

As another feature of this invention there is provided a novel process for preparing the above deuterated petroleum fraction lubricating oils with an isotopic purity of at least 95 atom percent D. The process comprises bringing together the light substrate in its liquid state and deuterium gas in the presence of a Group VII or VIII metal catalyst at temperatures below the boiling point of the substrate whereby a hydrogen-deuterium exchange between deuterium gas and the liquid lube oil takes place. The process can be carried out in a batch or co-current exchange system or in a countercurrent system. The reactors employed for these systems are essentially the same except in the batch system the substrate is layered above the catalyst bed and the deuterium gas is fed in at the bottom of the reactor and allowed to flow through the catalyst bed and substrate while in the cocurrent system the $D_2$ gas and substrate are each fed in at the top of the reactor and allowed to flow down through the catalyst bed and in the countercurrent system the $D_2$ gas is added at the bottom of the reactor and the substrate at the top so that they pass through the catalyst bed in opposite directions. Theoretically more efficient use of the $D_2$ gas is possible with the countercurrent reactor resulting in a shorter reaction time and less $D_2$ gas requirement per unit amount of deuterated product obtained.

As starting material there may be used a branched or straight chain, acyclic or cyclic hydrocarbon lubricating oil, either saturated or unsaturated and optionally mixtures thereof. It is well known for example, that lubricating oils can be discrete chemical compounds such as squalane, pristane, n-pentadecane, 2,6,11,15-tetramethylhexadecane, 2,2,4,4,6,8,8-heptamethylnonane and other hydrocarbon petroleum products having a melting point no greater than 300° C., all of said substances being well known in the trade. Usually, however, the lubricating oils are supplied as mixtures of different molecular weight species. In either case, the selected lubricating oil can be deuterated by the process of this invention to provide lubricants with improved oxidation resistance. It is to be noted that in all cases the deuterated product ultimately obtained is the fully saturated equivalent of the starting material.

The hydrogen-deuterium exchange between deuterium gas and the hydrocarbon liquid is carried out below the boiling point of each hydrocarbon usually within a temperature range of 100° C. to 300° C. with a preferred temperature range of from 150° to 250° C. It was found that by operating at a temperature below the boiling point of the hydrocarbon, cracking of the hydrocarbon is negligible since 1 percent or less of the deuterated products have a significantly higher or lower boiling point than the desired deuterated hydrocarbon.

As catalyst there may be used any of the common catalysts from Group VII or VIII metals preferably supported on an inert carrier. Illustrative examples are rhenium, palladium, platinum and rhodium on an activated carbon bed although other carriers as kieselguhr, silica gel, pumice or other well-known carriers can be employed. Palladium and rhenium have been found to be efficient general purpose catalysts. The amount of catalyst is not critical but generally at least 2 percent of the catalyst on a carrier, such as activated carbon, has been found to effectively catalyze the conversion of the starting material to the deuterated product.

Dispersion of the deuterium gas in the hydrocarbon liquid is carried out by regulating the flow of deuterium to preferably 40 to 150 ml./min. (although a higher or lower rate of flow could be used) through a porous glass disk into the stationary catalyst layer which has a mesh size of about 5–40 mesh and preferably 5–30 mesh. The flow of deuterium gas through the liquid substrate is carried out continuously for a period of time varying between 30 to about 5,000 hours, the length of time being dependent upon the number of carbon atoms in the hydrocarbon, its degree of unsaturation, the quantity of substrate to be deuterated and the attainment of at least a 95 percent deuteration of the hydrocarbon. Although the elapsed time required to prepare certain deuterated products can be several weeks, the process requires very little attention once in operation, except for the periodic withdrawal of samples for analysis.

Once the reaction is terminated the deuterated lubricating oil can be isolated by conventional methods which will vary depending upon whether the deuterated product is liquid or solid at room temperature. When the deuterated product is liquid at room temperature, it can be extracted with a low boiling hydrocarbon, for example, pentane or hexane and the solvent then removed by distillation and the deuterated hydrocarbon purified by distillation under vacuum. When the deuterated product is solid at room temperature it also can be extracted with a low boiling hydrocarbon, e.g. pentane, the solvent removed by distillation and the solid residue recrystallized from a low boiling solvent such as pentane. Certain of the higher molecular weight deuterated lubricating oils can be isolated by removing the solvent under high vacuum and the residual lubricant need not be distilled, or, more simply, they can be isolated by permitting them to drain from the catalyst.

An advantage of the process of the present invention resides in the fact that unsaturated hydrocarbons will ultimately lead to their fully saturated, deuterated counterparts if required.

A further advantage of the process of the present invention is that no cracking or isomerization of the substrate is observed under the conditions of exchange. The recovered deuterated products, where discrete chemical entities are employed as starting compounds, are homogenous by vapor phase chromatography and possess sharp melting points and correct boiling points. Further, it was found that the mass spectra corroborate the structures of these fully deuterated discrete chemical compounds and confirm their isotopic purity. However, epimerization of asymmetric carbon atoms does occur.

The novel deuterated hydrocarbons of the present invention are highly stable and have been found to be particularly useful in a variety of fields, such as superior lubricants either as such or compounded with a thickener to form a grease having enhanced oxidation resistance, longer service life and being suitable for use under vigorous operating temperatures; in radiolysis experiments, petroleum chemistry, and as high temperature lubricants or greases. The deuterated lubricating oils have been found superior to the undeuterated specie as specialty and instrument lubricants because of their greater oxidation resistance which provides longer service life and/or higher temperature operation. It has also been found that when compounded with thickeners such as lithium 12-hydroxystearate, diatomaceous earth, clay, silica or other known thickeners to form a grease, that said grease also has a longer service life because of the oxidation resistant property of the deuterated lubricating oil employed in its preparation.

The process for preparing the deuterated lubricating oils of the present invention will be more fully understood by referring to the following example:

EXCHANGE OF SYNTHETIC PETROLEUM a. One hundred grams of Mobil Research Development Corp., lubricating oil, Catalog No. RL-714 having the following properties:

| | |
|---|---|
| Molecular Weight (av.) | 515 |
| Viscosity cSt at: | |
| 210°F. | 5.80 |
| 100°F. | 32.05 |
| −40°F. | 7,353. |
| −65°F. | 51,910. |
| Specific Gravity at 70°F. | 0.83 |
| Pour Point, °F. (ASTM 97–52) | 65. |
| Flash Point, °F. (ASTM 92–57) | 445. | at a rate of 7–9 drops per minute and deuterium gas at a rate of 150 ml./minute were added to the top of a catalyst tower containing 15 g. 6% Pd/C, 6–8 mesh, heated to 250° C. The system was set up so that liquid flowing from the bottom of the reactor was automatically recycled back to the top of the reactor with a laboratory pump. After 400 hours of exchange, deuterated lubricating oil of 99 atom percent D overall was obtained.

b. By replacing the palladium on carbon catalyst employed in section (a) by an equivalent quantity of 5 percent rhenium on carbon catalyst and then following the procedure described in section (a) there is obtained deuterated lubricating oil, Mobil's RL-714, of 99 atom percent D.

What is claimed is:

1. Deuterated Mobil Research Development Corp. synthetic petroleum lubricating oil, Catalog No. RL–714 consisting of a saturated acyclic hydrocarbon characterized by having average molecular weight of 515, viscosity cSt at 210° F. of 5.80, at 100° F. of 32.05, at −40° F. of 7,353 and at −65° F. of 51,910, specific gravity at 70° F. of 0.83, pour point °F(ASTM 97-52) 65 and flash point °F(ASTM 92-57) 445, and containing at least 95 percent D with respect to the sum of H and D present in said lubricating oil.

* * * * *